United States Patent [19]

Funahashi

[11] Patent Number: 5,645,872
[45] Date of Patent: Jul. 8, 1997

[54] APPARATUS FOR PROCESSING FOOD INTO TUBULAR SHAPE

[75] Inventor: Noritaka Funahashi, Kasugai, Japan

[73] Assignee: Mitsutoyo Kiko, Co., Ltd., Kasugai, Japan

[21] Appl. No.: 695,127

[22] Filed: Aug. 8, 1996

Related U.S. Application Data

[63] Continuation of Ser. No. 418,492, Apr. 7, 1995, abandoned.

[30] Foreign Application Priority Data

Aug. 23, 1994 [JP] Japan ................. 6-198463

[51] Int. Cl.$^6$ .......................... B29C 47/20; B29C 47/88
[52] U.S. Cl. .................. 425/380; 264/558; 264/561; 264/563; 425/445; 425/464; 425/467; 426/514
[58] Field of Search ...................... 425/380, 467, 425/445, 464; 426/514; 264/558, 561, 563

[56] References Cited

U.S. PATENT DOCUMENTS

| 1,556,617 | 10/1925 | Laskey | 425/380 |
|---|---|---|---|
| 2,308,937 | 1/1943 | Schwab | 425/380 |
| 3,686,377 | 8/1972 | Hays | 264/563 |
| 4,859,165 | 8/1989 | Hoashi | 426/514 |
| 5,046,936 | 9/1991 | Bourdiol et al. | 425/467 |

FOREIGN PATENT DOCUMENTS

| 3022313 | 12/1980 | Germany | 264/561 |
|---|---|---|---|
| 1-213407 | 8/1989 | Japan | 425/467 |
| 3003914 | 8/1994 | Japan . | |
| 355247 | 8/1961 | Sweden | 425/380 |
| 1313896 | 5/1987 | U.S.S.R. | 425/380 |

Primary Examiner—Robert Davis
Attorney, Agent, or Firm—Davis and Bujold

[57] ABSTRACT

A method and an apparatus for processing food into a tubular shape is provided in which a die for processing the food includes a guide plate having a material outlet and a cylindrical feed pin having a water outlet at its center co-axially housed in the material outlet. The guide plate and feed pin cooperatively define a ring-like opening. Food material is extruded out of the ring-like opening in a tubular shape. Simultaneously, hot water is expelled out of the water outlet of the feed pin, flows into and fills a hollow inside the tubular food material. The hot water in the hollow prevents the wall of the tubular food material from collapsing and also accelerates coagulation of the food material. Food material is thus continuously processed into a tubular shape. An extruding die for performing the described method is also provided.

6 Claims, 2 Drawing Sheets

APPARATUS FOR PROCESSING FOOD INTO TUBULAR SHAPE

This application is a continuation of application Ser. No. 08/418,492 filed on Apr. 7, 1995, abandoned.

FIELD OF THE INVENTION

This invention relates to a method and apparatus for processing foods into a tubular shape.

BACKGROUND OF THE INVENTION

There are presently known a wide variety of processed foods in a tubular shape, such as macaroni made of flour and the Japanese processed food known as "chikuwa" which is made mainly of fish. In addition, in the Japanese Utility Model Application No. 6-4815 the inventor of the present invention proposed a "konnyaku" in a tubular shape similar to the shape of macaroni and chikuwa. "Konnyaku" is a jelly-like Japanese processed food which conventionally takes the shape of a bar of soap or noodle. Specifically, konnyaku is made from "Konnyaku potatoes" including glucomannan. When the glucomannan absorbs water, its expands and becomes an extremely larger volume colloid having high viscosity. When this colloid is added to lime water and other substances and heated, it coagulates as a translucent and elastic lump.

The above mentioned tubular foods are shaped in various manners. For instance, chikuwa is made by applying fish paste to the periphery of a rolling pin and baking or steaming it. Macaroni is shaped by extruding a kneaded mixture of flour and water out of a ring-like opening.

Tubular konnyaku, on the other hand, has not been commercially produced because of technical difficulties. For instance, the method for producing chikuwa is not appropriate for konnyaku. Specifically, the rolling pin around which the konnyaku material would be applied must be removed after the material has coagulated. When the material is konnyaku, it is tremendously difficult to pull away the rolling pin without destroying the desired tubular shape. Therefore, it is not feasible to produce tubular konnyaku, especially with small diameters, through the same method used to produce tubular chikuwa. Even if the tubular konnyaku to be formed is of a relatively larger diameter, the productivity would be too limited to realize commercial production.

The method for producing macaroni is also inappropriate for processing konnyaku since the wall of konnyaku material defining the hollow tubular shape tends to collapse because of its higher flowability, and spoil the desired hollow tubular shape of the final product before it coagulates.

SUMMARY OF THE INVENTION

Wherefore, an object of the present invention is to provide a novel method for continuously processing foods into a tubular shape, and also provide a die to be used in performing the method.

In order to attain the stated object, the method for processing foods into a tubular shape according to the present invention includes the steps of:

extruding food material having plasticity out of a ring-like aperture; and expelling gas or liquid, simultaneously with extruding the food material, out of a substantial center of the ring-like aperture so that the gas or liquid flows into a hollow inside the tubular food material, thereby aiding coagulation of the food material in a tubular shape.

Specifically, the food materials having plasticity may be, for instance, farinaceous material obtained from konnyaku potato or other potatoes, flour and other cereals, and proteinaceous material obtained from fish, meat, gelatin, beans, eggs and milk. These food materials, when required, have water and additives added thereto, are heated, and kneaded to make a fluid paste. When an optional appropriate secondary process is performed on the paste, the paste coagulates in an intended shape and thus the shape is maintained. The secondary process includes heating, cooling, desiccation, and addition of coagulant. A secondary process is selected according to the composition of the food material.

A tubular shaped konnyaku material that is formed simply by being extruded out of a ring-like opening tends to have its hollow deformed and spoiled because of the flowability of the food material which causes the material to collapse into the hollow. The present invention proposes to insert a flow of fluid into the hollow of the tubular foods. The pressure of the fluid inside the hollow supports the wall of the tubular food material and also enhances its coagulation. Since the wall is supported by fluid it is prevented from collapsing and the hollow is maintained even after coagulation, thereby providing the intended tubular foods.

The method according to the present invention is applicable to various food materials including konnyaku and noodles. Therefore, previously impossible mass-production of relatively long and thin tubular foods is made possible by the present invention. Chikuwa and tubular "kamaboko", which is also a Japanese processed food, can be continuously produced without using a rolling pin. Further, the present invention is also applicable to macaroni, especially those of smaller diameter than conventional macaroni.

The flow of fluid inserted into the hollow for supporting the wall of the food material may be any fluid that is not hazardous to the consumer's health. Generally, water, steam and air are inexpensive and easy to handle and therefore convenient for performing the present method. However, an appropriate gas or liquid should be selected in order to enhance coagulation of the wall defining the hollow.

If the food material coagulates when heated to or above a certain temperature, it is preferable that the gas or liquid inserted in the hollow is heated to a temperature substantially equal to or above this temperature. In this way, coagulation of the food material is enhanced as soon as the food material is extruded. Hot water, steam, or hot air is preferable for such food materials that coagulate upon being heated. If the food material should not be desiccated, the gas or liquid is preferably either hot water or steam.

Cold water is preferably utilized when the food material is gelatin or other material which coagulates upon being cooled. For pasted flour and other food materials that coagulate when dried, the liquid or gas is preferably dry air. If the food material should be protected from humidity, oils are preferably used, and, if oxidation is to be prevented, carbonic acid gas or nitrogen gas, for example, are used. Additionally, a coagulant solution may be utilized for the food materials which coagulates upon contact with a coagulant.

The liquid may include a highly viscous fluid such as starch in a gel state. It would be appropriate to use such a fluid when making a hollow of relatively larger diameter to prevent the fluid from prematurely draining out of the hollow before the material has sufficiently coagulated. In this case the food material would coagulate as a solid body with the thick, viscous fluid contained in the hollow. The fluid would be later dissolved or removed by, for example, being washed away with water.

When using liquid as the flowing agent, preservatives, antioxidant, colorant, color developer, bleaching agent, thickener and other food additives may be added to the liquid.

Further, the method would be best accomplished by using an extruding die which includes: a guide plate having a first aperture through which the food material is extruded; and a feed pin having a second aperture through which the gas or liquid is expelled. The feed pin is disposed co-axially in the first aperture substantially at the center thereof. By using such a die, food material is extruded, in a tubular shape, out of a ring-like aperture formed between the outer surface of the feed pin and an inner surface of the first aperture. Simultaneously, gas or liquid is expelled out of the second aperture provided in the feed pin. The gas or liquid inside the extruded tubular food material supports the inner wall of the hollow and also enhances coagulation of the inner wall of the hollow. Thus, the hollow is maintained during the coagulation process, and the intended tubular processed food is obtained.

DETAILED DESCRIPTION OF THE PREFERRED EMBODIMENT

Figure 1:
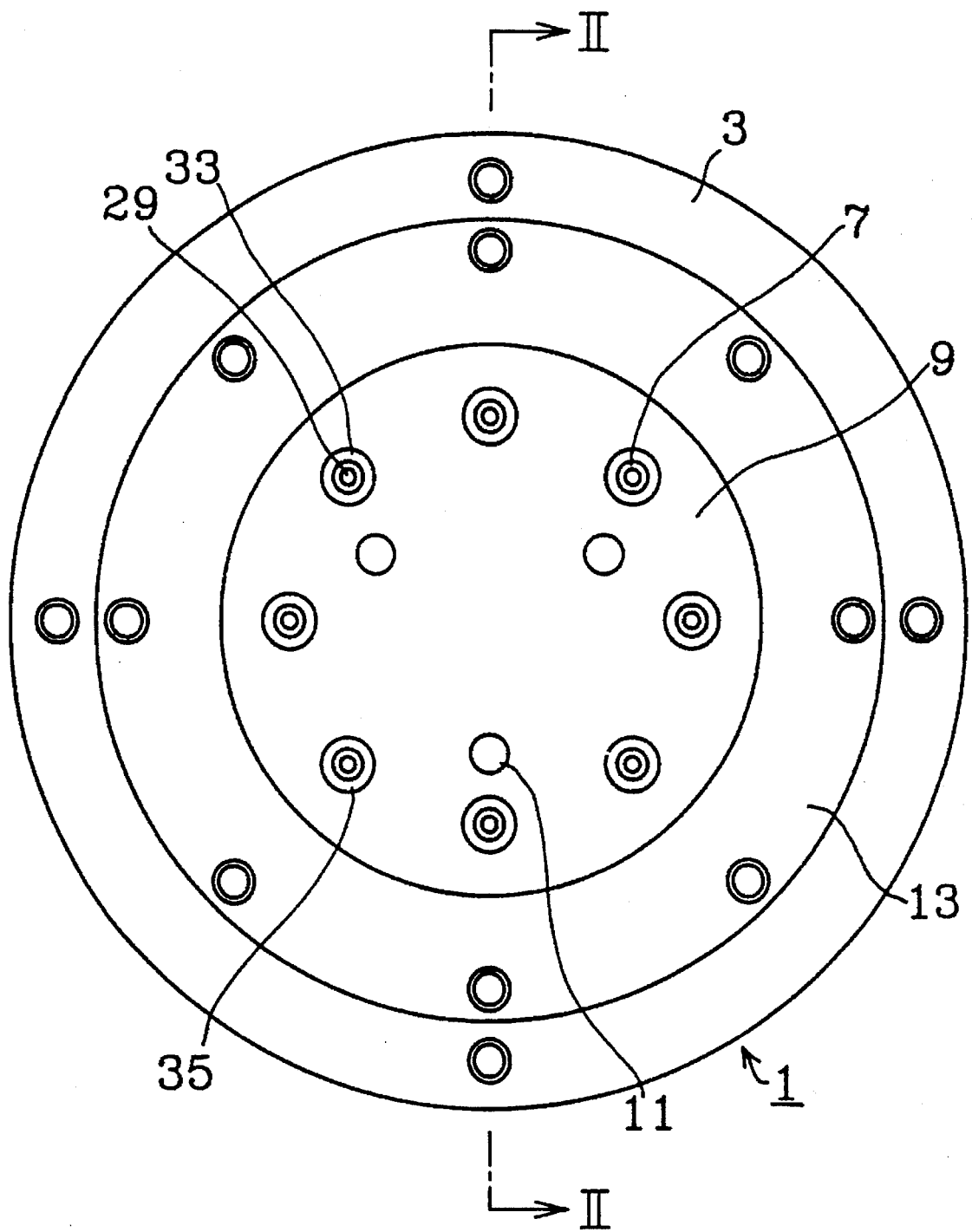
FIG. 1 is a front view of the die used to process konnyaku material into a tubular shape according to the invention.
Figure 2:
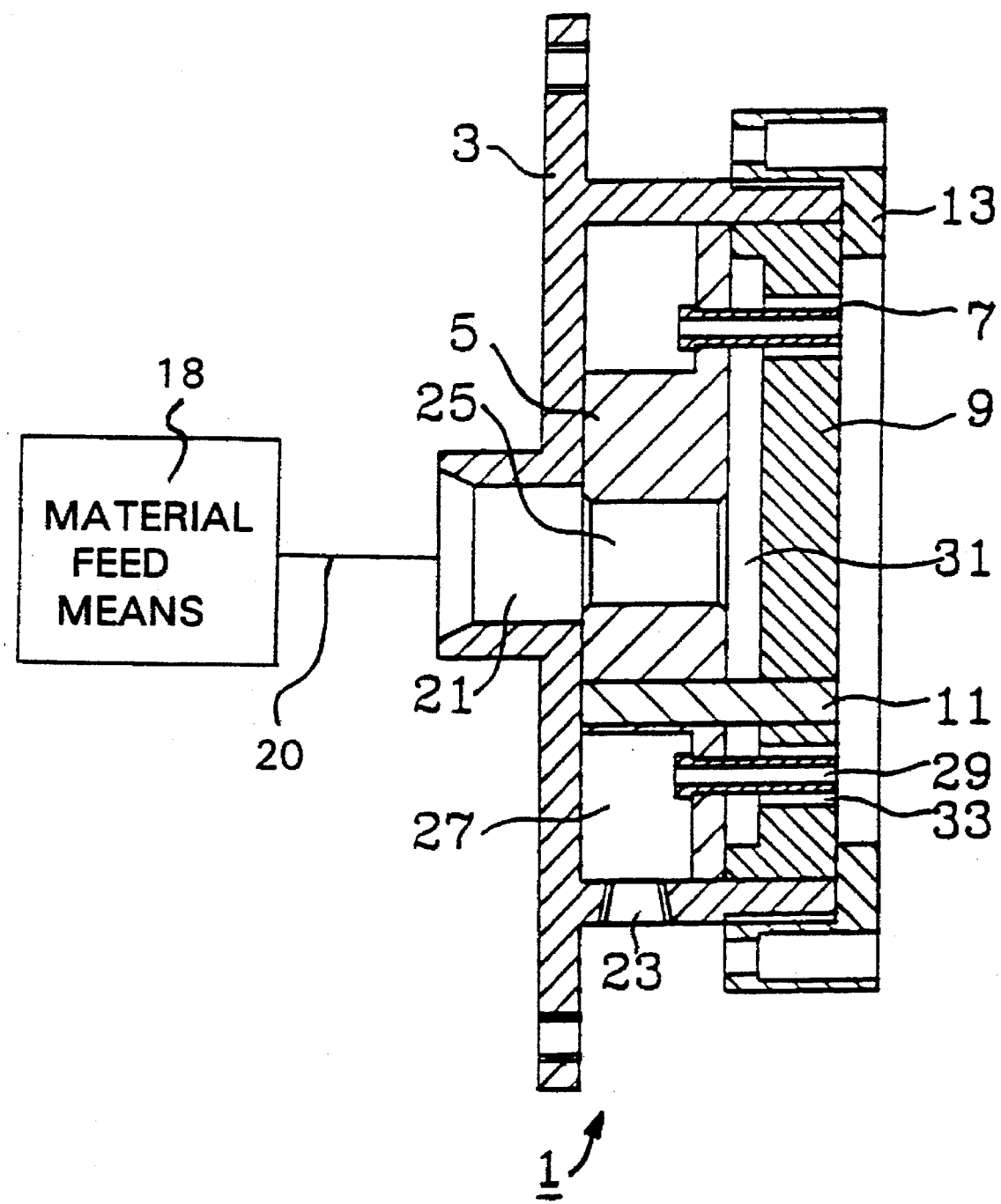
FIG. 2 is a sectional side view taken along the line II—II of FIG. 1.

FIGS. 1 and 2 show an extruding die to be used for processing konnyaku material into a tubular shape. The die 1, whose parts are all made of stainless steel, includes a case 3, a pin holder 5 inserted into the case 3, eight feed pins 7 fixed to the pin holder 5, guide plate 9 inserted into the case 3 overlying the front of the pin holder 5, three positioning pins 11 for fixing the pin holder 5 and guide plate 9 at an appropriate relative position, and a flange cap 13 screwed into the case 3 for fixing the pin holder 5 and guide plate 9 to the case 3.

As shown in FIG. 2, the case 3 has a material inlet 21 and a water inlet 23. The pin holder 5 has a through hole 25 communicating with the material inlet 21. The pin holder 5 and case 3 cooperatively define a ring-like water allocation chamber 27 communicating with the water inlet 23. Each of the feed pins 7 has a water outlet 29, formed at its axial center, communicating with the water allocation chamber 27. Between the pin holder 5 and the guide plate 9 there is provided a material allocation chamber 31 communicating with the through hole 25. The guide plate 9 has eight material outlets 33 communicating with the material allocation chamber 31. Each of the eight material outlets 33 co-axially houses a respective feed pin 7, thereby forming a ring-like aperture 35, as shown in FIG. 1, between the outer surface of each feed pin 7 and the inner surface of each material outlet 33.

In operation, konnyaku material in a jelly-like state is supplied from a konnyaku pasting device (flowable food material feed means 18), via an appropriate path 20, and injected into the material inlet 21. The konnyaku material is then passed through the through hole 25, into the material allocation chamber 31 and is extruded out each of the eight material outlets 33 in a tubular shape.

The water inlet 23 is connected to a hot-water heater (not shown) and is supplied with hot water therefrom. The hot water is passed through the water allocation chamber 27 and flows out each of the eight water outlets 29.

If the conventional method, wherein material is simply pushed out of a ring-like opening, were adopted, the cylindrical hollow formed thereby would be easily obstructed by the surrounding wall due to the high flowability of konnyaku material forming the wall. The high flowability or plasticity of the konnyaku material causes the walls to collapse, destroying the desired tubular shape. In contrast, by using the die 1 according to the present invention, the cylindrical hollow is promptly filled with and supported by hot water coming through the water outlets 29. The hot water also helps the konnyaku material coagulate by heating its inner surface, thereby further facilitating maintenance of the cylindrical hollow by accelerating coagulation. As a result, tubular shaped konnyaku is continuously an reliably produced from the material outlets 33.

Additional heating of the konnyaku material may be provided by blowing hot steam over the tubular konnyaku exiting the material outlets 33, or by heating the guide plate 9 so as to further assist coagulation of the konnyaku.

The tubular shaped konnyaku extruded out of the material outlets 33 is cut to the desired length and cooled, for instance in cold water, producing the final product.

Thus, by using the method according to the present invention, even konnyaku which has high flowability can be readily processed into tubular shape. Hence, mass-production of tubular konnyaku, which has not previously been commercially realized, is made possible for the first time by the present invention.

Since the hot water supplied into the cylindrical hollow for facilitating coagulation also prevents the surrounding wall from collapsing, a rolling pin which would need to be removed can be dispensed with. Therefore, not only tubular konnyaku of a relatively large diameter, but also those of extremely small diameters can be formed by using the method according to the present invention.

The present invention has been described above with reference to the preferred embodiments as shown in the drawings. Modifications and alterations may become apparent to one skilled in the art upon reading and understanding the specification. Despite the use of the embodiments for illustration purposes, the invention is intended to include all such modifications and alterations within the scope and spirit of the appended claims. The present invention has been described as processing konnyaku. However, the method of the present invention is also applicable to the processing of noodles, fish-paste products such as chikuwa, macaroni and other flowable materials into a tubular shape. The method of the present invention proves to be especially advantageous when utilized in processing of chikuwa and other fish-paste products into a tubular shape because the present method makes unnecessary the labor required to wash rolling pins and apply fish-paste to the rolling pins. Moreover, the method according to the present invention attains processing of macaroni of smaller diameter than is attained by existing processes since the hollow is not easily deformed as the food material is extruded.

In the present invention the hollow is filled with hot water. However, it can be appreciated that the hot water can be replaced with hot steam. Further, food additives may be added to the liquid that is to fill the hollow. For instance, if a preservative is added to the liquid, the inner surface of the hollow would be coated with the preservative. Likewise, if a colorant is added to the liquid, the inner surface of the hollow would be colored and the color of the inner surface would be visible through the material, assuming that the material is translucent, thereby providing a novel and unique appearance for the food.

The fluid used to fill the hollow is not limited to hot water or hot steam, but may be varied according to the food material. For instance, when making tubular jelly from gelatin, cold water is preferable for filling the hollow. When making macaroni from flour, dry air is preferably used. If the material is to be protected from humidity, oils may be used. If the material should be protected against oxidation, then carbonic acid gas, nitrogen gas or other appropriate gas is preferably used. If the material coagulates upon contact with a coagulant, that coagulant may be contained in the liquid for filling the hollow.

Moreover, when making the hollow of a relatively large diameter, starch or other highly viscous fluid may be used as the liquid for filling the hollow to prevent the fluid from prematurely draining out of the hollow before the material has sufficiently coagulated. After coagulation, such tubular foods will have a solid body stuffed by the fluid and will therefore be more sturdy. The fluid in the hollow may later be removed by, for instance, being washed away with water.

Further, although the profile of the material outlet of the described embodiment is round, it may be rectangular or other form to produce the tubular foods with virtually any desired outer shape.

Wherefore, having described the present invention, what is claimed is:

1. A konnyaku die for forming konnyaku food material into a plurality of tubular members each having a hollow interior, said konnyaku die comprising:

a guide plate having a plurality of peripherally disposed apertures extending therethrough;

flowable konnyaku food material feed means communicating with each of said plurality of peripherally disposed apertures for supplying the konnyaku food material thereto;

hot liquid feed means for filling the interiors of formed tubular members to prevent collapse of the tubular members and facilitate coagulation of the konnyaku food material, said hot liquid feed means comprising a plurality of hot liquid feed pins, with each pin having an orifice extending axially therethrough for feeding a hot liquid through each associated hot liquid pin; and each hot liquid feed pin being centrally disposed within one of said plurality of peripherally disposed apertures to define a plurality of annular passages between an outer surface of said hot liquid feed pins and an opposed surface of each of said plurality of peripherally disposed apertures extending through said guide plate;

whereby when the konnyaku food material is supplied and extruded through said annular passages and formed into a plurality of tubular members, each having a hollow interior, the hot liquid is simultaneously fed through said orifices of said hot liquid feed pins for filling the hollow interiors of each formed tubular member.

2. A konnyaku die for forming konnyaku food material into a plurality of tubular members each having a hollow interior, said konnyaku die comprising:

an exterior casing supporting a guide plate having a plurality of peripherally disposed apertures extending therethrough and a pin holder plate being supported within said exterior casing adjacent to said guide plate;

said pin holder plate comprising a plurality of peripherally disposed hot liquid feed pins, one of said hot liquid feed pins being centrally disposed in each of said plurality of peripherally disposed apertures to define a plurality of peripherally disposed annular passages between an outer surface of said hot liquid feed pins and an opposed surface of each of said plurality of peripherally disposed apertures extending through said guide plate;

said guide plate and said pin holder plate cooperating with one another to define a konnyaku allocation chamber being located between said guide plate and said pin holder plate, said konnyaku allocation chamber communicating with said peripherally disposed annular passages and a konnyaku food material inlet extending through a central portion of said exterior casing, and said konnyaku food material inlet communicating with both said konnyaku allocation chamber and a konnyaku feed means; and said exterior casing further comprising a wall being located adjacent to said pin holder plate and remote from said guide plate, said wall and said pin holder plate cooperating with one another to define a hot liquid allocation chamber located between said pin holder plate and said wall, said hot liquid allocation chamber communicating with said hot liquid feed pins, each said hot liquid feed pin having an orifice extending axially therethrough for feeding a hot liquid through said hot liquid feed pins, and a hot liquid inlet extending through said exterior casing and communicating with said hot liquid allocation chamber;

whereby when the konnyaku food material is supplied and extruded through said annular passages and formed into a plurality of tubular members, each having a hollow interior, the hot liquid is simultaneously fed through said orifices of said hot liquid feed pins for filling the hollow interiors of each formed tubular member.

3. A konnyaku die according to claim 1, further comprising an exterior casing which supports said guide plate and a pin holder plate is supported within said exterior casing adjacent to said guide plate, said guide plate and said pin holder plate cooperate with one another to define a food konnyaku allocation chamber located between said guide plate and said pin holder plate, said konnyaku allocation chamber communicates with said annular passages and a konnyaku food material inlet extends through said exterior casing and communicates with said konnyaku allocation chamber and said konnyaku feed means.

4. A konnyaku die according to claim 3, wherein said exterior casing further comprises a wall located adjacent to said pin holder plate remote from said guide plate, said wall and said pin holder plate cooperate with one another to define a hot liquid allocation chamber located between said pin holder plate and said wall, said hot liquid allocation chamber communicates with said orifices in said hot liquid feed pins and a hot liquid inlet extends through said exterior casing and communicates with said hot liquid allocation chamber;

whereby said konnyaku allocation chamber is completely separate and isolated from said hot liquid allocation chamber.

5. A konnyaku die according to claim 2, wherein said hot liquid feed pins are supported by said pin holder plate.

6. A konnyaku die according to claim 3, wherein said hot liquid feed pins are supported by said pin holder plate.

* * * * *